Patented Aug. 24, 1948

2,447,565

UNITED STATES PATENT OFFICE 2,447,565

PRODUCTION OF ALDEHYDES BY A HALOGEN-HYDROGEN EXCHANGE REACTION

Joseph A. Chenicek, Riverside, Ill., assignor to Universal Oil Products Company, Chicago, Ill., a corporation of Delaware No Drawing. Application January 31, 1946, Serial No. 644,673

7 Claims. (Cl. 260—599)

1

This invention relates to a process for producing an aldehyde by a halogen-hydrogen exchange between an acyl halide and a saturated hydrocarbon. More particularly, the process is concerned with the interaction of an aroyl halide and an isoparaffinic hydrocarbon in the presence of a Friedel-Crafts catalyst to form an aromatic aldehyde and a mono halide of the isoparaffinic hydrocarbon.

An object of this invention is to convert an acyl halide into an aldehyde.

Another object of this invention is to produce an aromatic aldehyde.

A further object of this invention is to produce an aldehyde by reacting an acyl halide and a saturated hydrocarbon having at least one tertiary carbon atom per molecule in the presence of a Friedel-Crafts metal halide catalyst.

One specific embodiment of the present invention comprises a process for reacting an acyl halide and a saturated hydrocarbon containing at least on tertiary carbon atom per molecule in the presence of a Friedel-Crafts metal halide catalyst at conditions such that the formation of an aldehyde and a mono halide of said saturated hydrocarbon constitute the principal reaction of the process.

Acyl halides employed in my process are obtained from any source. These acyl halides include particularly the acid chlorides and acid bromides of aliphatic, naphthenic and aromatic carboxylic acids.

Saturated hydrocarbons which undergo a halogen-hydrogen exchange reaction with an acyl halide in my process contain at least one tertiary carbon atom per molecule and comprise particularly isoparaffinic hydrocarbons and alkyl cycloparaffinic hydrocarbons. Thus isopentane may be made to react with an acid chloride of an aliphatic carboxylic acid to produce an aliphatic aldehyde and tertiary amyl chloride. Other paraffinic hydrocarbons containing at least one tertiary carbon atom per molecule may also be reacted with an acyl halide under such conditions that a hydrogen atom attached to a tertiary carbon atom will be replaced by the halogen atom of the acyl halide and the acyl halide will be converted into an aldehyde. Naphthenic hydrocarbons such as alkyl cycloparaffins, decalin and other cycloparaffins containing at least one

2 tertiary carbon atom per molecule may be made to react similarly with an acyl halide to effect a halogen-hydrogen transfer reaction and produce an aldehyde and a halogenated naphthenic compound.

The process of the present invention is carried out in the presence of a catalyst of the Friedel-Crafts type. Such active halide catalysts include aluminum chloride, aluminum bromide, zirconium chloride, zinc chloride, stannic chloride, etc. The conditions of operation utilizable with these catalysts of the Friedel-Crafts type may be different depending upon the catalytic activities and other factors. These different catalytic materials may be utilized as such or they may be composited with one another or deposited upon solid carriers or supporting materials to produce catalyst composites of desired activities. Catalyst carriers or supports include both adsorptive and substantially nonadsorptive materials including alumina, activated charcoal, crushed porcelain, raw and acid treated clays, diatomaceous earth, pumice, fire brick, etc. The carriers should be substantially inert in the sense that substantially no interaction which is detrimental to the activity or selectivity of the catalyst composite should occur between the carrier and the Friedel-Crafts type catalyst.

The present process for effecting halogen-hydrogen transfer from an acyl halide to a saturated hydrocarbon containing at least one tertiary carbon atom per molecule and particularly to a paraffinic or naphthenic hydrocarbon, may also be catalyzed by boron fluoride and hydrogen fluoride although such a conversion is not necessarily carried out at the same conditions of operation as are used when a metal halide of the Friedel-Crafts type is employed as catalyst.

The present process for producing an aldehyde and a monohalo-alkane may be illustrated by the following equation relating to a reaction between isopentane and benzoyl chloride to produce benzaldehyde and tertiary amyl chloride.

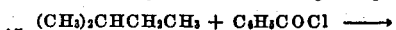

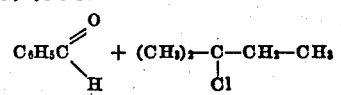

The transfer of halogen from an acyl halide, preferably in which the halogen is a middle halogen such as chlorine or bromine, to a saturated hydrocarbon containing at least one tertiary carbon atom per molecule is carried out by reacting said hydrocarbon and acyl halide in the presence of a catalyst of the Friedel-Crafts type generally at a temperature of from about −40° to about +100° C. The conditions of operation are so controlled as to effect formation of the aldehyde and halogenated compound as the principal products of the process. The time of reaction is generally relatively short in order to prevent the desired reaction product from undergoing further conversion in the presence of the catalyst. In some cases it is desirable to limit the time of reaction by continuously passing the reaction mixture from the reactor into water to quench and prevent further action of the catalyst. In some cases it is desirable to recycle the catalyst, and accordingly, quenching of the reaction mixture is not utilized; but other means are employed for rapidly separating the reaction mixture and used catalyst from the reaction products. Such a separation may be effected readily when a supported catalyst is employed as a reactor filling material.

Continuous operation of the present process may be carried out by preparing a solution of a catalyst in a saturated hydrocarbon containing at least one tertiary carbon atom per molecule and continuously commingling this solution with a second solution containing an acyl halide dissolved in another portion of the saturated hydrocarbon. The separately prepared solutions are mixed conveniently in a Y-tube or other suitable reactor and thence passed directly into a quenching bath of water so that the total time of contact of the catalyst and the organic halide is relatively short. Sometimes the quenching operation is not necessary and other means are used for separating the organic products from the used catalyst so that the latter may be returned to the process, generally in the form of a catalyst sludge.

In some cases it may be desirable to commingle the charged acyl halide and saturated hydrocarbon with a substantially inert solvent such as a normal paraffinic hydrocarbon and then to effect the halogen transfer reaction in the presence of the added solvent. Obviously the solvent employed should be one which does not itself undergo undesirable reactions at the operating conditions chosen for the process.

The following example is given to illustrate the process, although the data presented are not introduced with the intention of unduly restricting the generally broad scope of the invention.

100 grams of powdered aluminum chloride was placed in a 500-ml. 3-necked flask, fitted with stirrer, dropping funnel and thermometer and was covered with 100 ml. of isopentane. Then 50 grams of benzoyl chloride were diluted with 100 ml. of isopentane and the mixture was slowly added to the stirred isopentane-aluminum chloride slurry at room temperature. After all was added the mixture was stirred two hours longer. At the end of this time it was poured into cold water, made alkaline with sodium carbonate solution, and extracted with ether. The ether extracts were shaken with saturated sodium bisulfite solution and the bisulfite addition compound of benzaldehyde which formed was removed by filtration and washed with ether. The solid was then treated with sodium carbonate solution to liberate benzaldehyde which was extracted with ether. After evaporation of the ether about 6 grams of benzaldehyde remained. This was identified by means of its phenyl hydrazone.

The character of the invention and the type of results obtained by its use are evident from the preceding specification and example, although they are not to be construed as imposing undue limitations on its generally broad scope.

I claim as my invention:

1. A process which comprises reacting an acyl halide and a saturated hydrocarbon containing at least one tertiary carbon atom per molecule in the presence of a Friedel-Crafts catalyst at a temperature of from about −40° to about 100° C. and for a time such as to convert said acyl halide into an aldehyde and said saturated hydrocarbon into a halogenated hydrocarbon having the same number of carbon atoms per molecule as said hydrocarbon.

2. A process which comprises reacting an acyl halide and a paraffinic hydrocarbon containing at least one tertiary carbon atom per molecule in the presence of a Friedel-Crafts catalyst at a temperature of from about −40° to about 100° C. and for a time such as to convert said acyl halide into an aldehyde and said paraffinic hydrocarbon into a halogenated hydrocarbon having the same number of carbon atoms per molecule as said hydrocarbon.

3. A process which comprises reacting an acyl halide and a naphthenic hydrocarbon containing at least one tertiary carbon atom per molecule in the presence of a Friedel-Crafts catalyst at a temperature of from about −40° to about 100° C. and for a time such as to convert said acyl halide into an aldehyde and said naphthenic hydrocarbon into a halogenated hydrocarbon having the same number of carbon atoms per molecule as said hydrocarbon.

4. A process which comprises reacting an aroyl halide and a saturated hydrocarbon containing at least one tertiary carbon atom per molecule in the presence of a Friedel-Crafts catalyst at a temperature of from about −40° to about 100° C. and for a time such as to convert said aroyl halide into an aldehyde and said saturated hydrocarbon into a halogenated hydrocarbon having the same number of carbon atoms per molecule as said hydrocarbon.

5. A process which comprises reacting a benzoyl halide and a saturated hydrocarbon containing at least one tertiary carbon atom per molecule in the presence of a Friedel-Crafts catalyst at a temperature of from about −40° to about 100° C. and for a time such as to convert said benzoyl halide into benzaldehyde and said saturated hydrocarbon into a halogenated hydrocarbon having the same number of carbon atoms per molecule as said hydrocarbon.

6. A process which comprises reacting benzoyl chloride and a saturated hydrocarbon containing at least one tertiary carbon atom per molecule in the presence of a Friedel-Crafts catalyst at a temperature of from about −40° to about 100° C. and for a time such as to convert said benzoyl chloride into benzaldehyde and said saturated hydrocarbon into a chlorinated hydrocarbon having the same number of carbon atoms per molecule as said hydrocarbon.

7. A process which comprises reacting benzoyl chloride and a saturated hydrocarbon containing at least one tertiary carbon atom per molecule in the presence of an aluminum chloride catalyst at a temperature of from about −40° to about 100° C. and for a time such as to convert said benzoyl chloride into benzaldehyde and said saturated hydrocarbon into a chlorinated hydrocarbon having the same number of carbon atoms per molecule as said hydrocarbon.

JOSEPH A. CHENICEK.

REFERENCES CITED

The following references are of record in the file of this patent:

UNITED STATES PATENTS

| Number | Name | Date |
|---|---|---|
| 1,939,005 | Guthke | Dec. 12, 1933 |
| 1,989,700 | Larson | Feb. 5, 1935 |
| 2,158,519 | Meuly | May 16, 1939 |
| 2,271,299 | Ipatieff et al. | Jan. 27, 1942 |

FOREIGN PATENTS

| Number | Country | Date |
|---|---|---|
| 2,878 | Great Britain | 1880 |